US010449890B2

United States Patent
Reid

(10) Patent No.: US 10,449,890 B2
(45) Date of Patent: Oct. 22, 2019

(54) HINGED TRUCK BED STOP

(71) Applicant: Michael Reid, Salisbury, NC (US)

(72) Inventor: Michael Reid, Salisbury, NC (US)

( * ) Notice: Subject to any disclaimer, the term of this patent is extended or adjusted under 35 U.S.C. 154(b) by 17 days.

(21) Appl. No.: 15/831,690

(22) Filed: Dec. 5, 2017

(65) Prior Publication Data

US 2018/0201178 A1 Jul. 19, 2018

Related U.S. Application Data

(60) Provisional application No. 62/446,661, filed on Jan. 16, 2017.

(51) Int. Cl.
| | | |
|---|---|---|
| *B60P 7/08* | (2006.01) | |
| *B60P 7/14* | (2006.01) | |
| *B60R 5/00* | (2006.01) | |
| *B60R 5/04* | (2006.01) | |
| *B62D 33/00* | (2006.01) | |
| *B62D 33/02* | (2006.01) | |
| *B60P 3/00* | (2006.01) | |
| *B62D 33/04* | (2006.01) | |

(52) U.S. Cl.
CPC .............. *B60P 7/14* (2013.01); *B60P 3/00* (2013.01); *B60R 5/00* (2013.01); *B60R 5/003* (2013.01); *B60R 5/04* (2013.01); *B60R 5/042* (2013.01); *B62D 33/00* (2013.01); *B62D 33/02* (2013.01); *B62D 33/04* (2013.01); *B62D 33/042* (2013.01)

(58) Field of Classification Search
CPC ..... B60P 7/14; B60P 3/00; B60R 7/02; B60R 9/065; B60R 5/00; B60R 5/003; B60R 5/04; B60R 5/042; B62D 33/042; B62D 33/00; B62D 33/02; B62D 33/04
USPC ....... 410/121, 127, 128, 129, 130, 135, 140, 410/141; 296/24.4, 37.6, 26.1, 26.11, 296/37.5, 39.2; 220/531
See application file for complete search history.

(56) References Cited

U.S. PATENT DOCUMENTS

| | | | | |
|---|---|---|---|---|
| 1,542,342 | A * | 6/1925 | Doctor ...................... | B60R 9/02 5/316 |
| 5,392,972 | A * | 2/1995 | Caruso ...................... | B60R 7/02 |
| 5,586,850 | A * | 12/1996 | Johnson .................... | B60P 7/14 410/129 |
| 7,566,085 | B2 * | 7/2009 | Jaskolski ........... | B62D 33/0273 |

* cited by examiner

*Primary Examiner* — Stephen T Gordon
(74) *Attorney, Agent, or Firm* — Ward and Smith, P.A.; Ryan K. Simmons

(57) ABSTRACT

A truck bed stop, including a bottom base; an upper base, hingedly attached to the bottom base; one or more attachment points disposed on the upper base portion; and one or more attachment rods, wherein a first end of one of the one or more attachment rods is configured to attach to one of the one or more attachment points disposed on the upper base and a second end of the one of the one or more attachment rods is configured to attach to one of one or more secondary anchor points, and wherein the one or more attachment rods are configured to hold the upper base in an angled position relative to the bottom base.

8 Claims, 3 Drawing Sheets

HINGED TRUCK BED STOP

RELATED APPLICATIONS

This application claims priority to and incorporates herein by reference related U.S. Provisional Patent Application No. 62/446,661, entitled "Hinged Truck Bed Stop" filed on Jan. 16, 2017.

TECHNICAL FIELD

The disclosed subject matter relates generally to truck accessories. Specifically, the disclosed subject matter relates to a hinged truck bed stop.

BACKGROUND

In conventional pickup truck beds, when items are placed in the bed of the truck they have a tendency to move around while the truck is moving unless the items are otherwise secured in place through the use of ropes, straps, bungee cords, netting, and/or the like. Such movement of items in the truck bed is undesirable for many reasons, for example the item may become damaged or may cause damage to other items in the truck bed, and/or to the truck bed itself. Another disadvantage to having items move around unrestricted in the bed of the truck is that it may be difficult to later retrieve the item out of the truck bed. For example, someone may place a small gas can in the bed of the truck and purposely position it relatively close to the tailgate for easy retrieval. If not otherwise restrained, during transport the gas may easily slide around the bed of the truck and may tip over and/or move, for example, to a front/middle portion of the truck bed furthest away from the tailgate and sides making it very difficult to retrieve the gas can without having to climbing into the bed of the truck.

It is therefore an object of the present invention to provide an easy and simple device for keeping items from moving around unrestricted in a truck bed during transport.

Other objects and advantages will be more fully apparent from the following disclosure and appended claims.

SUMMARY

In one embodiment, the hinged truck bed stop may include a bottom base; an upper base, hingedly attached to the bottom base; one or more attachment points disposed on the upper base portion; and one or more attachment rods, wherein a first end of one of the one or more attachment rods is configured to attach to one of the one or more attachment points disposed on the upper base and a second end of the one of the one or more attachment rods is configured to attach to one of one or more secondary anchor points, and wherein the one or more attachment rods are configured to hold the upper base in an angled position relative to the bottom base. The one or more attachment rods may be configured to hold the upper base in a substantially perpendicular position relative to the bottom base. The one or more secondary anchor points may be separate from the bottom base and the upper base. The one or both of the bottom base and upper base may further include a non-skid or skid resistant material thereon. The one or more attachment rods may be adjustable in length. The one or both of the bottom base and the upper base may be sized and configured to at least partially fit between inner wheel wells of a truck bed. The upper base may be hingedly attached to the bottom base by one or more hinges. The upper base may be hingedly attached to the bottom base by a flexible type material affixed therebetween and configured to allow the upper base to hinge relative to the bottom base.

In another embodiment, a method of using a truck bed stop may include positioning the truck bed stop within a truck bed; adjusting an upper base of the truck bed stop relative to a bottom base of the truck bed stop to achieve a desired angle therebetween; connecting a first end of one of one or more attachment bars to one of one or more attachment points disposed on the upper base and a second end of the one of the one or more attachment bars to a corresponding one of one or more secondary anchor points; and placing one or more items for transport on a top surface of the bottom base. The truck bed stop may include a bottom base; an upper base, hingedly attached to the bottom base; one or more attachment points disposed on the upper base portion; and one or more attachment rods, wherein a first end of one of the one or more attachment rods is configured to attach to one of the one or more attachment points disposed on the upper base and a second end of the one of the one or more attachment rods is configured to attach to one of one or more secondary anchor points, and wherein the one or more attachment rods are configured to hold the upper base in an angled position relative to the bottom base.

Certain aspects of the subject matter of the invention having been stated hereinabove, which are addressed in whole or in part by the disclosed subject matter, other aspects will become evident as the description proceeds when taken in connection with the accompanying Examples and Drawings as best described herein below.

BRIEF DESCRIPTION OF THE DRAWINGS

Figure 1:
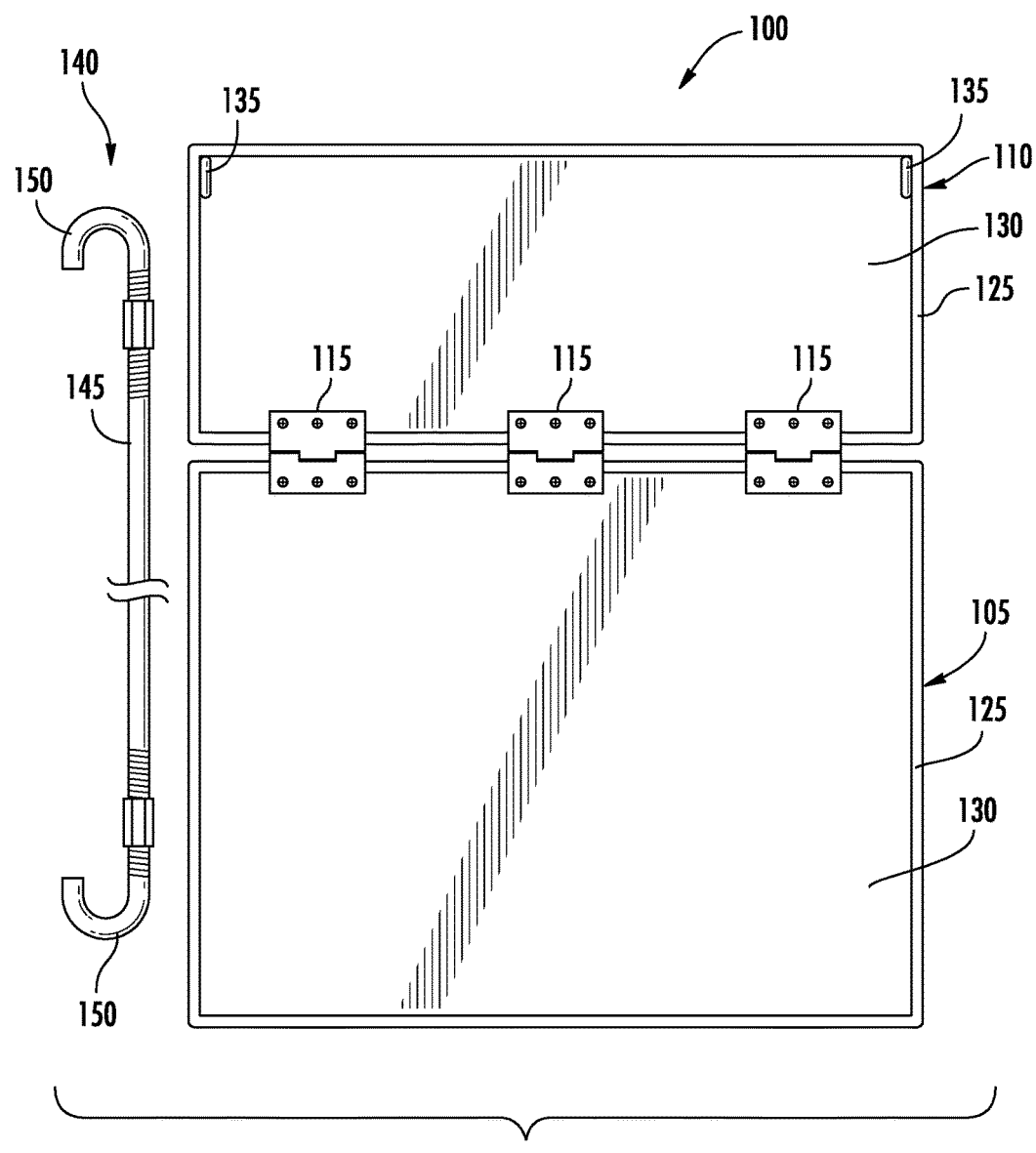

Having thus described the subject matter of the invention in general terms, reference will now be made to the accompanying Drawings, which are not necessarily drawn to scale, and wherein:

FIG. 1 illustrates a plan view of a truck bed stop according to an embodiment of the invention.

Figure 2:
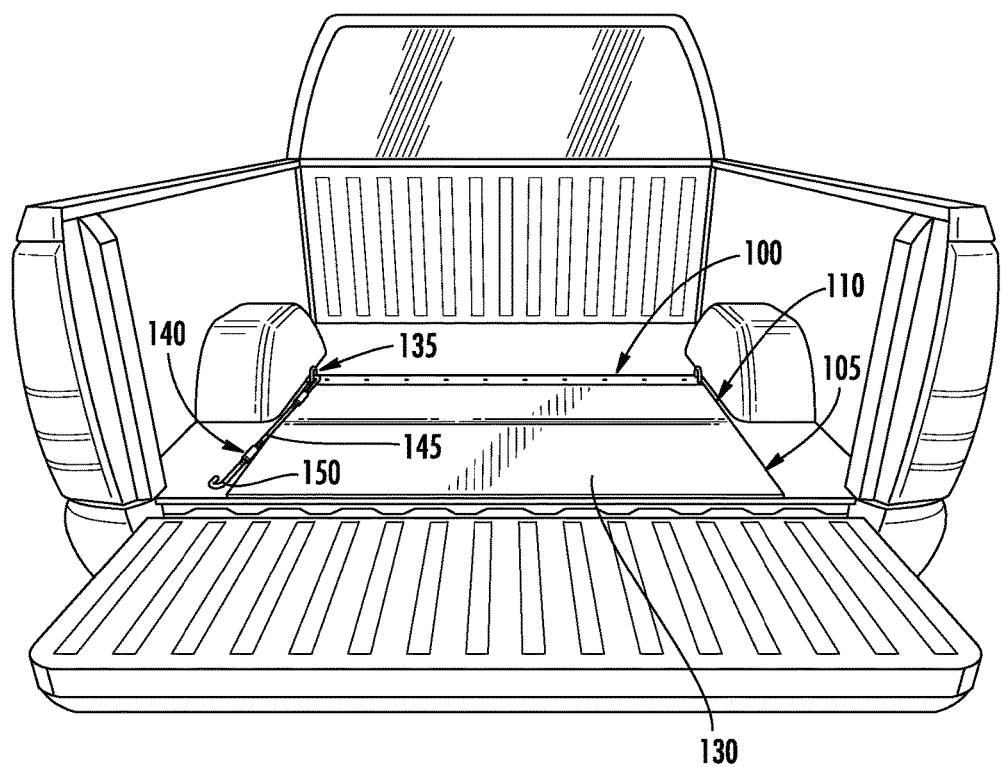

FIG. 2 illustrates a perspective view of the truck bed stop installed in a truck bed in a down position according to an embodiment of the invention.

Figure 3:
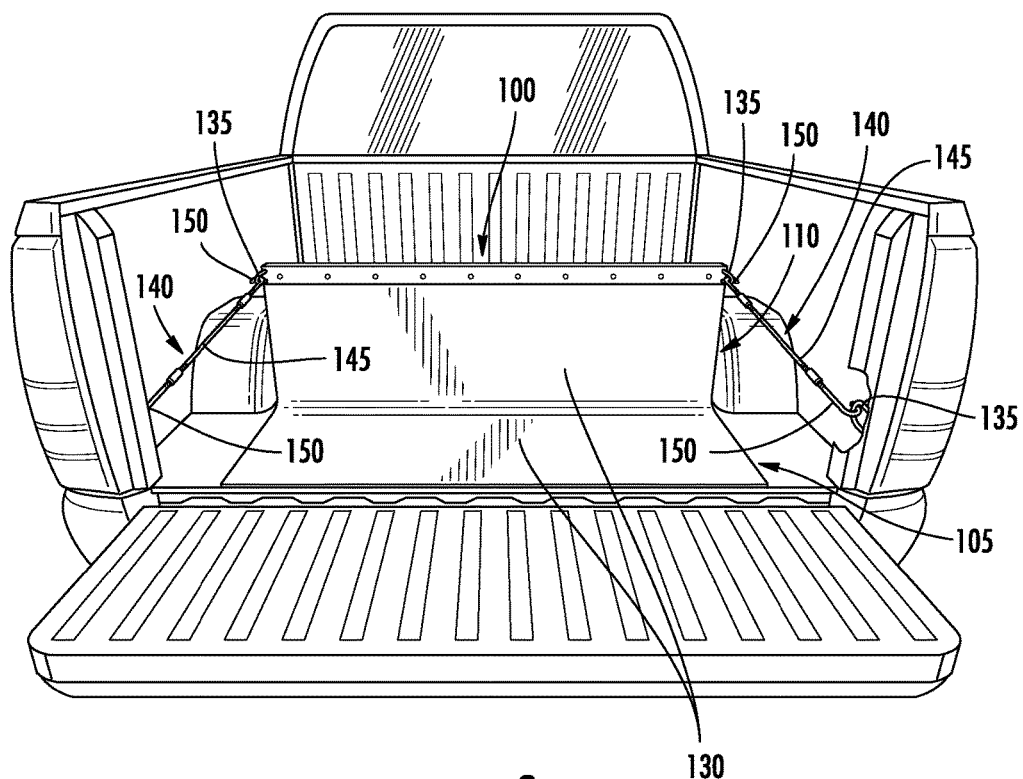

FIG. 3 illustrates a perspective view of the truck bed stop installed in a truck bed in an upright position according to an embodiment of the invention.

DETAILED DESCRIPTION

The subject matter of the invention now will be described more fully hereinafter with reference to the accompanying Drawings, in which some, but not all embodiments of the disclosed subject matter are shown. Like numbers refer to like elements throughout. The disclosed subject matter may be embodied in many different forms and should not be construed as limited to the embodiments set forth herein; rather, these embodiments are provided so that this disclosure will satisfy applicable legal requirements. Indeed, many modifications and other embodiments of the disclosed subject matter set forth herein will come to mind to one skilled in the art to which the disclosed subject matter pertains having the benefit of the teachings presented in the foregoing descriptions and the associated Drawings. Therefore, it is to be understood that the disclosed subject matter is not to be limited to the specific embodiments disclosed and that modifications and other embodiments are intended to be included within the scope of the appended claims.

Referring now to FIGS. 1-3, illustrate views of truck bed stop 100. Truck bed stop 100 preferably includes a bottom base 105 connected to an upper base 110. In one embodiment, bottom base 105 and upper base 110 may be hingeably connected via one or more hinges 115, such that truck bed stop 100 may be foldable between a first position and a second position. In the first position truck bed stop 100 is preferably in a down (flat) position, wherein bottom base 105 and upper base 110 are both substantially horizontal and lying substantially flat relative to a surface of a truck bed. In the second position truck bed stop 100 is preferably in an upright position, wherein bottom base 105 and upper base 110 are substantially perpendicular relative to one another. In the upright position, bottom base 105 is substantially horizontal and lying flat relative to the surface of the truck bed, and upper base 110 is substantially vertical and perpendicular relative to the bottom base 105. In alternate embodiments, upper base 110 may be positioned at other angles (e.g., less than or greater than perpendicular), relative to bottom base 105. One or more hinges 115 may be any jointed, flexible device, or other mechanism that allows the pivoting of upper base 110 and bottom base 105 relative to one another. In a non-limiting example, one or more hinges 115 may be any typical hinge, such as a butt hinge, pivot hinge, and the like. In another non-limiting example, one or more hinges 115 may be a joint where upper base 110 and bottom base 105 are connected via stitching or by a flexible type material affixed (e.g., adhered or stitched), or formed between upper base 110 and bottom base 105, and which allows pivoting of upper base 110 and bottom base 105 relative to one another.

One or both of bottom base 105 and upper base 110 are preferably made of a rigid or semi-rigid plastic material, or may be made of any other suitably rigid or semi-rigid material, such as, but not limited to one or more of metal, wood, rubber, and/or other suitable material. In one example, bottom base 105 and upper base 110 may each be about a ¼ inch thick; however, other thickness greater or less than ¼ inch may be used as well. Each of bottom base 105 and upper base 110 are preferably of a width substantially equal to or less than a width between inner wheel wells of a truck bed in which the truck bed stop 100 is installed. In one embodiment, bottom base 105 and upper base 110 have a width in the range of about 40-50 inches. In an alternative embodiment, upper base 110 may have a width substantially equal to or less than the width between the inner wheel wells of the truck bed, and bottom base 105 may have a width that is greater than the width between the inner wheel wells. In another example, bottom base 105 may have a length of about 30 inches and upper base 110 may have a height of about 12 inches. Preferably, the height of upper base 110 is such that it does not extend past the upper edge of a side of a truck bed it is installed in when the upper base 110 is in its upright position. In one embodiment, bottom base 105 may be in the range of about twenty (20) inches wide and about forty-eight (48) inches long, upper base 110 may in the range of about twelve (12) inches wide and about forty-eight (48) inches long. It is understood; however, that the dimensions of bottom base 105 and upper base 110 may be in any range that is suitable for its installation and use in a truck bed.

Bottom base 105 and/or upper base 110 may be substantially rectangular in shape. However, bottom base 105 and/or upper base 110 may be of any other suitable shape. In one example, one or both of bottom base 105 and upper base 110 may taper along their length, e.g., narrowing in the region of bottom base 105 and/or upper base 110 that are disposed between the inner wheel wells of the truck bed.

In one embodiment, one or both of base 105 and upper base 110 may be made of a single layer of material, or alternatively they may include a first layer 125 and a second layer 130, wherein first layer 125 may be made of a rigid or semi-rigid material, such as any one or more of plastic, metal, wood, and/or other suitable material and second layer 130 may be made of a preferably non-skid or skid resistant material, such as rubber, carpet, grip tap, or other suitable non-skid or skid resistant material. In one example, first layer 125 and second layer 130 may each be about ¼ inch thick; however, other thickness greater or less than ¼ inch may be used as well. In one example, first layer 125 may provide structural support and second layer 130 may provide anti-skid or skid resistance properties. Second layer 130 may be attached to first layer 125, by one or more of screws, nails, staples, hook and loop fasteners, adhesives, and/or any other suitable technique or mechanism. In another example, first layer 125 and a second layer 130 may be one in the same, wherein the non-skid or skid resistant components are formed directly on or into first layer 125, e.g., ridges, tread, and/or the like, and wherein the non-skid or skid resistant components in such an embodiment would be the equivalent of second layer 130.

Truck bed stop 100 may further include one or more attachment points 135, for attachment of one or more attachment bars 140. Attachment points 135 are preferably disposed on upper base 110, for example, attachment points 135 may be positioned at opposing upper corners of upper base 110. Attachment points may include eye hooks, eyelets, hooks, holes, or any other suitable mechanism to allow for attachment of one or more attachment bars 140 thereto.

Attachment bars 140 may be any suitable mechanism to allow for attachment of the upper base 110 to a portion of the truck bed when the truck bed stop 100 is in an upright position. In one example, attachment bar 140 comprises a rod 145 with a hook portion 150 disposed at each end of the rod 145, wherein when truck bed stop 100 is in an upright position the hook portion 150 on one end of the rod 145 is capable of engaging with one of attachment points 135 (e.g., an eye hook), and the hook portion 150 at the other opposing end of rod 145 is capable of engaging with one of the connection points located on the truck bed (e.g., standard truck bed anchor point or other attachable point of the truck bed), such that the truck bed stop 100 maintains its upright position, e.g., with upper base 110 being substantially perpendicular to bottom base 105. In one embodiment, attachment bar 140 is made of a rigid or semi-rigid material, such that the upper base 110 does not fall to a flat position when attachment rod 140 is installed and engaged with the attachment point 135 and truck bed anchor point. In another alternative embodiment, attachment bars 140 may be adjustable in length, such that the angle of upper base 110 relative to bottom base 105 can be adjusted. In one embodiment, attachment bars 140 may be about twenty (20) inches long, and may be adjustable in the range of about twenty (20) inches to about twenty-six (26) inches in length.

In operation, truck bed stop 100 may be installed in a truck bed, preferably in proximity to a rear portion of the truck bed (e.g., toward the tailgate), for easy access to items which may be placed thereon. Initially, the truck bed stop 100 may be in a down position wherein both the bottom base 105 and upper base 110 are substantially horizontal and lying flat relative to the surface of the truck bed, and preferably wherein the bottom base 105 does not extend out past the rear most edge of the truck bed, e.g., such that it does not interfere with operation of the tailgate. When needed, items may be placed on a top surface of the bottom base 105, wherein the surface of the bottom base 105 may have anti-skip or skid resistant properties, e.g., second layer 130. Upper base 110 may be hinged to its upright position, which in one example, is substantially perpendicular relative to bottom base 105. One or more attachments bars 140 are connected at one end to one or more attachment points 135 and at their other end to one or more truck bed attachment points, such as a standard truck bed anchor point. If needed, the length of the one or more attachments bars 140 may be adjusted to position upper base 110 at any suitable angle relative to bottom base 105. In one example, upper base 110 may be at a about a 90 degree angle relative to bottom base 105.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A truck bed stop, comprising:
   a. a bottom base having a front edge and a rear edge, and wherein the bottom base is horizontally orientated and substantially flat;
   b. an upper base having a top edge and a bottom edge, wherein the upper base is hingedly attached along its bottom edge to the rear edge of the bottom base;
   c. one or more attachment points disposed on the upper base; and
   d. one or more attachment rods, wherein a first end of each of the one or more attachment rods is configured to attach to the one or more attachment points disposed on the upper base and a second end of each of the one or more attachment rods is configured to attach to one or more secondary anchor points, wherein the one or more secondary anchor points are positioned within an interior portion of a truck bed and are separate from and not attached to the bottom base, and wherein the one or more attachment rods are configured to hold the upper base in an angled position relative to the bottom base.

2. The truck bed stop of claim 1 wherein the one or more attachment rods are configured to hold the upper base in a substantially perpendicular position relative to the bottom base.

3. The truck bed stop of claim 1 wherein one or both of the bottom base and upper base further comprise a non-skid or skid resistant material thereon.

4. The truck bed stop of claim 1 wherein the one or more attachment rods are adjustable in length.

5. The truck bed stop of claim 1 wherein one or both of the bottom base and the upper base are sized and configured to at least partially fit between inner wheel wells of a truck bed.

6. The truck bed stop of claim 1 wherein the upper base is hingedly attached to the bottom base by one or more hinges.

7. The truck bed stop of claim 1 wherein the upper base is hingedly attached to the bottom base by a flexible type material affixed therebetween and configured to allow the upper base to hinge relative to the bottom base.

8. A method of using a truck bed stop, the method comprising:
   a. positioning the truck bed stop within a truck bed, the truck bed stop comprising:
      i. a bottom base having a front edge and a rear edge, and wherein the bottom base is horizontally orientated and substantially flat;
      ii. an upper base having a top edge and a bottom edge, wherein the upper base is hingedly attached along its bottom edge to the rear edge of the bottom base;
      iii. one or more attachment points disposed on the upper base; and
      iv. one or more attachment rods, wherein a first end of each of the one or more attachment rods is configured to attach to the one or more attachment points disposed on the upper base and a second end of each of the one or more attachment rods is configured to attach to one or more secondary anchor points, wherein the one or more secondary anchor points are positioned within an interior portion of a truck bed and are separate from and not attached to the bottom base, and wherein the one or more attachment rods are configured to hold the upper base in an angled position relative to the bottom base;

b. adjusting the upper base of the truck bed stop relative to the bottom base of the truck bed stop to achieve a desired angle therebetween;

c. connecting a first end of the one or more attachment rods to the one or more attachment points disposed on the upper base and the second end of the one or more attachment rods to the one or more secondary anchor points; and d. placing one or more items for transport on a top surface of the bottom base.

* * * * *